US006829697B1

(12) United States Patent
Davis et al.

(10) Patent No.: US 6,829,697 B1
(45) Date of Patent: Dec. 7, 2004

(54) MULTIPLE LOGICAL INTERFACES TO A SHARED COPROCESSOR RESOURCE

(75) Inventors: Gordon Taylor Davis, Chapel Hill, NC (US); Marco C. Heddes, Raleigh, NC (US); Ross Boyd Leavens, Cary, NC (US); Mark Anthony Rinaldi, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 451 days.

(21) Appl. No.: 09/656,582

(22) Filed: Sep. 6, 2000

(51) Int. Cl.[7] ........................ G06F 15/00; G06F 15/76
(52) U.S. Cl. ........................ 712/21; 721/220; 718/103
(58) Field of Search ................................ 712/220–228, 712/1–43; 718/103, 106; 709/1–108

(56) References Cited

U.S. PATENT DOCUMENTS

| | | | | |
|---|---|---|---|---|
| 4,809,169 A | * | 2/1989 | Sfarti et al. ................... | 712/20 |
| 4,876,643 A | * | 10/1989 | McNeill et al. ............. | 710/110 |
| 5,404,469 A | * | 4/1995 | Chung et al. ................ | 712/215 |
| 5,748,468 A | * | 5/1998 | Notenboom et al. ........... | 700/3 |
| 5,928,322 A | * | 7/1999 | Bitar et al. .................. | 709/103 |
| 6,016,542 A | * | 1/2000 | Gottlieb et al. ............. | 712/225 |
| 6,219,833 B1 | * | 4/2001 | Solomon et al. ............ | 717/149 |
| 6,226,738 B1 | * | 5/2001 | Dowling ..................... | 712/225 |
| 6,532,530 B1 | * | 3/2003 | Kim et al. .................... | 712/35 |

* cited by examiner

*Primary Examiner*—Weng-Al T. An
*Assistant Examiner*—Phuong N. Hoang
(74) *Attorney, Agent, or Firm*—James A. Lucas; Driggs, Lucas, Brubaker & Hogg Co., LPA (57) ABSTRACT

An embedded processor complex contains multiple protocol processor units (PPUs). Each unit includes at least one, and preferably two independently functioning core language processors (CLPs). Each CLP supports dual threads thread which interact through logical coprocessor execution or data interfaces with a plurality of special purpose coprocessors that serve each PPU. Operating instructions enable the PPU to identify long and short latency events and to control and shift priority for thread execution based on this identification. The instructions also enable the conditional execution of specific coprocessor operations upon the occurrence or non occurrence of certain specified events.

27 Claims, 6 Drawing Sheets

Coprocessor Wall

Figure 6a

Coprocessor Wall and Branch

Figure 6b

MULTIPLE LOGICAL INTERFACES TO A SHARED COPROCESSOR RESOURCE

FIELD OF THE INVENTION

This invention relates to the field of network processor systems. More particularly, it relates to an embedded processor complex containing one or more protocol processor units (PPUs). Multiple coprocessors are used in connection with the PPUs within the processor system through interfaces that interconnect the PPUs and the coprocessors for transmitting data and instructions therebetween.

BACKGROUND OF THE INVENTION

The use of protocol processor units to provide for and to control the programmability of a network processor is well known. Likewise, the use of coprocessors with the PPU in the design of a computer system processing complex architecture is dwell established. Delays in processing events that require real time processing is a problem that directly affect system performance. By assigning a task to a specific coprocessor, rather than requiring the PPU to perform the task, the efficiency and performance of a computer system can be increased. It is important for the PPU to communicate with the coprocessors in an efficient manner. Continuing improvements in this communication are constantly being sought.

SUMMARY OF THE INVENTION

An object of the present invention is the use of Protocol Processor Units (PPU) which contain one or more core language processors (CLPs) each of which has a plurality of threads and instructs special task coprocessors through a logical coprocessor interface.

Another object is the use of multiple logical coprocessor interfaces (from the perspective of a programmer) to access a shared coprocessor resource. In some cases the coprocessor resource is shared among multiple processing threads within a PPU, while in other cases a single coprocessor resource is shared among multiple PPUs.

An additional object of the present invention relates to specific operations which are enabled at the interface between a PPU and its coprocessors. One such operation is the ability to conditionally execute coprocessor instructions. This is especially useful with the counter coprocessor, but may be generally applied to other coprocessors as well. The coprocessor interface has the ability to identify long latency events and short latency events according to the expected response time to a particular coprocessor command. This identification is then used to control the priority for thread execution.

Still another object of the present invention is a coprocessor interface that provides more flexibility and efficiency than other known coprocessor interfaces.

These and other objects are achieved in the manner to be hereinafter described in greater detail.

The operation of an embedded processor complex for controlling the programmability of a network processor is described. The processor complex includes a plurality of protocol processor units (PPUs), each protocol processor unit containing one or more core language processors (CLPs). Each CLP has multiple code threads. Each PPU utilizes a plurality of coprocessors useful for executing specific tasks for the PPUs. The complex uses multiple logical coprocessor interfaces to access a shared coprocessor resources with the CLPs. Specific operating instructions are executed by the CLPs resulting in commands sent to the coprocessors. One aspect of these instructions serves to enable conditional execution of specific coprocessor instructions. The instruction is able to identify long latency events and short latency events according to the expected response time to a particular coprocessor command. This permits the complex to transfer control from one thread to another depending on the length and type of latency event being processed.

DETAILED DESCRIPTION OF THE INVENTION

The invention will be described in terms of an embedded processor complex that provides and controls the programmability of a network processor. One implementation of the complex typically includes eight main processing units or protocol processor units (PPUs) that work with hardware accelerators to support high speed pattern search, data manipulation, internal chip management functions, frame parsing, and data pre-fetching. Each PPU comprises the following structural components: Two CLPs; at least one, and preferably several dedicated and/or shared coprocessor units and an interface between the main processing unit and each of the coprocessor units.

Each coprocessor unit is able to execute specific networking tasks. The main processing unit executes a sequence of instructions in a stored program. Each coprocessor unit is responsive to said main processing unit, and is adapted to efficiently perform specific tasks under the control of the main processing unit. The interface between the main processing unit and each coprocessor unit enables one or more of the following functions: configuration of each coprocessor unit; initiation of specific tasks to be completed by each coprocessor unit; access to status information relating to each coprocessor unit; and provision of means for returning results relating to specific tasks completed by each coprocessor unit. The main processing unit and coprocessor unit each includes one or more special purpose registers. The interface is capable of mapping the special purpose registers from said main processing unit and coprocessor units into a common address map.

Each PPU includes one or more core language processors (CLPs) and several dedicated coprocessors. When the PPU includes multiple CLPs, the coprocessors are shared among the CLPs.

Each CLP contains one arithmetic logic unit (ALU) and supports two code threads for a total of four threads for each PPU. The CLP and coprocessors contain independent copies of special purpose registers including scalar registers and array registers. Certain coprocessors include FIFO buffers which regulate the transfer of coprocessor commands from the CLP into the array or scalar registers of the coprocessors. A CLP executes only one thread command at a time. To a programmer, each thread has the appearance of its own coprocessor or set of coprocessors. Most of the coprocessors perform specialized functions and can operate concurrently with each other and with the CLPs.

Control store for the PPU is typically provided by both internal and external memories. For example, internal SRAM can be used for immediate access; external ZBT SRAM for fast access; and external DDR SDRAM for large storage requirements.

Figure 1:
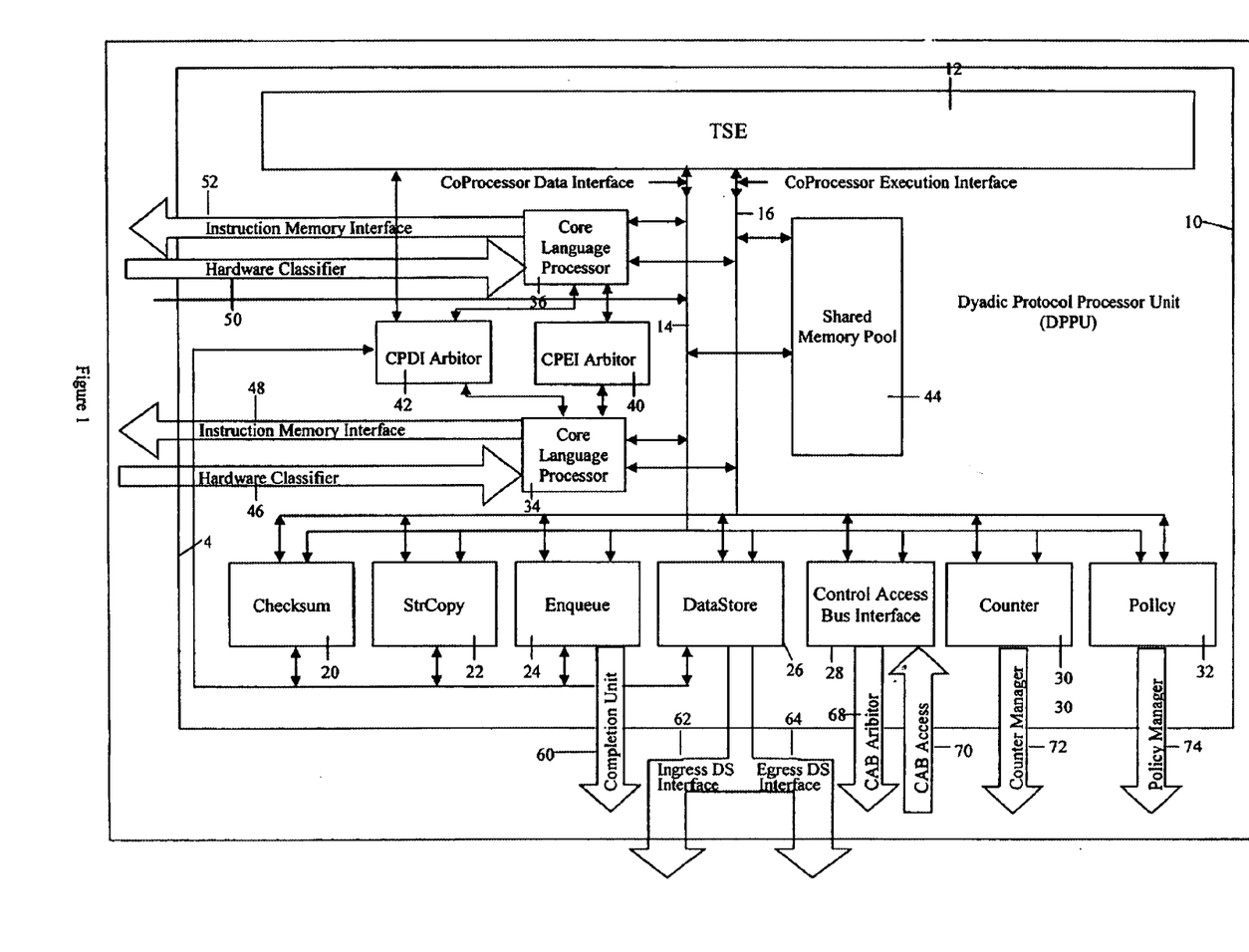
FIG. 1 is an overall block diagram showing a protocol processing unit with two core language processors and coprocessors

FIG. 1 shows a protocol processor unit (PPU) (10) that maintains a data interface (14) and an execution interface (16) with several coprocessors including a tree search engine (12), a checksum coprocessor (20), a string copy coprocessor (22), an enqueue coprocessor (24), a datastore coprocessor (26), a control access bus coprocessor (28), a counter coprocessor (30) and a policy coprocessor (32).

The PPU includes a pair of core language processors (CLPs) (34) and (36). Each CLP includes an Instruction Fetch Decode and Execute, a plurality of special and general purpose registers and two threads. A coprocessor execution interface (CPEI) arbiter (40) arbitrates instructions between the two CLPs and the coprocessors. A coprocessor data interface (CPDI) arbiter (42) determines the priority of communication between the coprocessors and the CLPs (34) and (36). All instructions for the CLPs are stored in an instruction memory (not shown in FIG. 1).

CLP #1 (34) receives communications along bus (46) from a hardware classifier which provides the stimulus from a dispatcher to start processing a new packet. The CLP sends fetching instructions along bus (48) from the instruction memory to process the new packet. Likewise, CLP (36) receives classification results along a bus (50) from a hardware classifier and sends requests along bus (52) to an instruction memory interface. The instruction memory interface and hardware classifier are located outside of the PPU and are not shown on FIG. 1.

The enqueue coprocessor (24) sends instructions along bus (60) to an external completion unit (not shown). The data store coprocessor (26) sends data along bus (62) to an ingress datastore interface or along bus (64) to an egress data store interface. The flow of control data is arbitrated by an external control access bus arbiter (not shown) along bus (68). The regulation of the access is on the CAB arbiter (68) while the data which is being written or read is flowing through bus (70). Data access is input or output along bus (70). The counter coprocessor (30) and the policy coprocessor (32) each provide access to the counter manager and the policy manager along buses (72) and (74), respectively.

Figure 2:
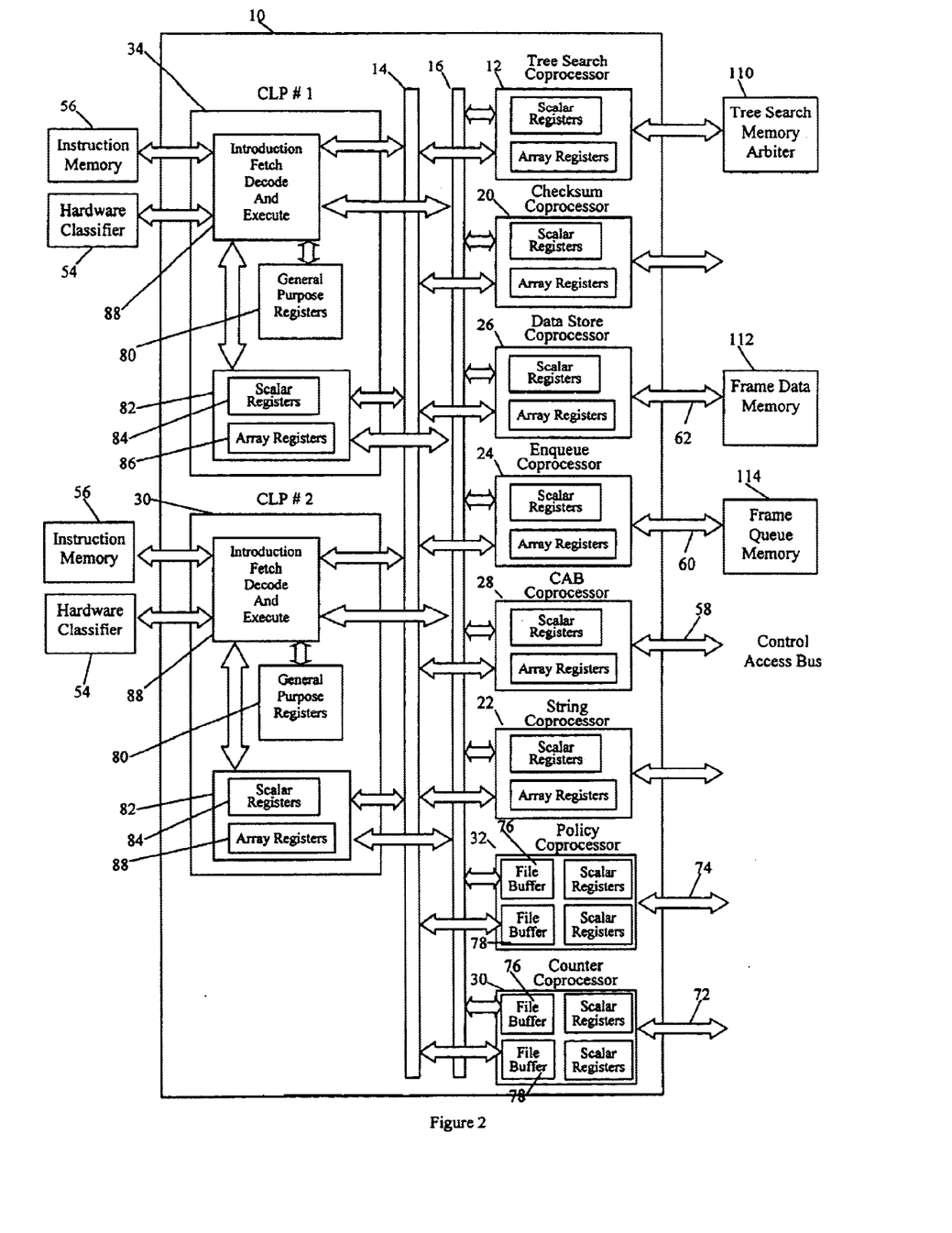
FIG. 2 is a block diagram of a protocol processor unit showing two core language processors interfaced with the coprocessors.
Figure 3:
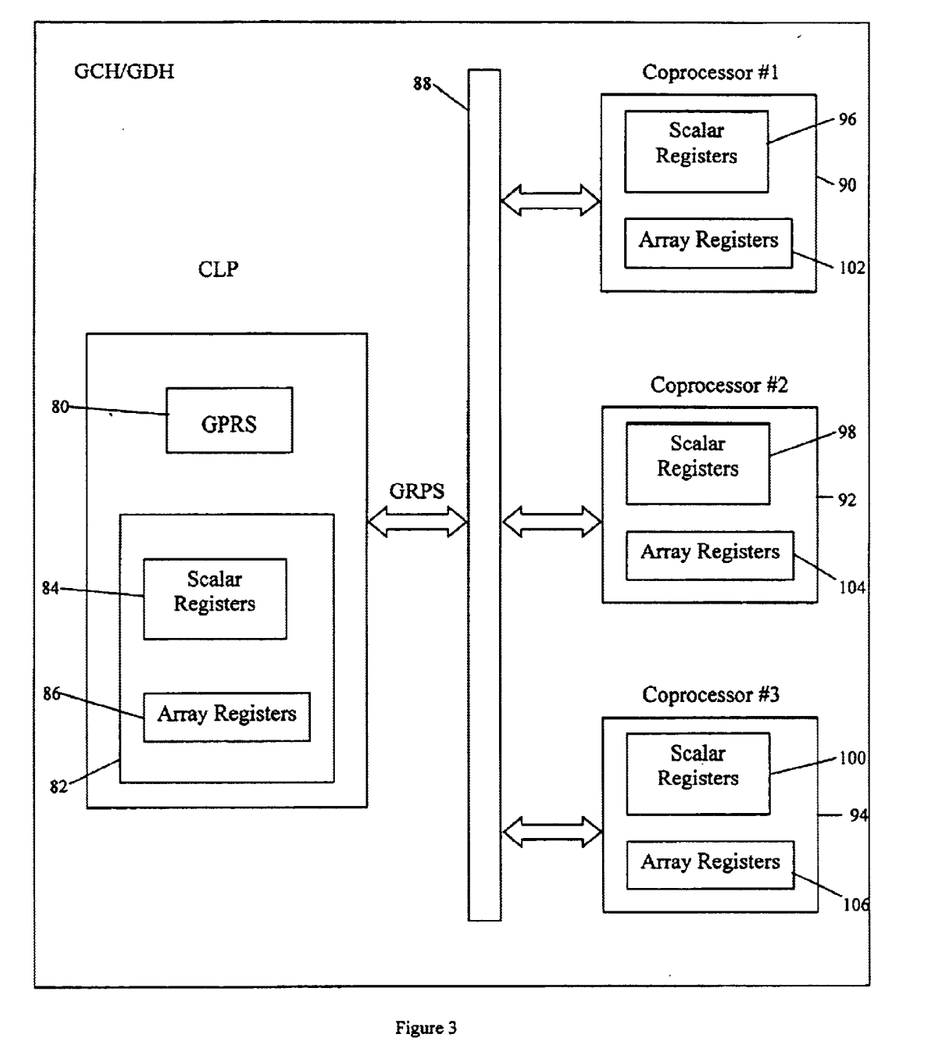
FIG. 3 is a block diagram showing an interface between a core language processor and selected coprocessors.

FIG. 2 shows additional details of the two CLPs according to the present invention. Each CLP includes general purpose registers (80) and special purpose registers (82). These special purpose registers include a plurality of scalar registers (84) and array registers (86). It also includes an Instruction Fetch, Decode and Execute function (88).

The processing complex includes the following components:

A plurality of protocol processor units. In a preferred embodiment, the server uses eight protocol processor units (PPU). Each PPU includes one or more CLPs that share a plurality of coprocessors (seven being shown).

The PPU executes the code used for forwarding frames, updating tables and maintaining the network processing unit.

The CLPs concurrently execute code dW is stored in a common Instruction Memory. Each CLP includes a core and a 3-stage pipeline, 16 GPRs (general purpose registers) and an ALU (arithmetic logic unit). The coprocessors can execute operation concurrently with each other and concurrently with the CLP. When the coprocessor is interfaced with the CLP, it extends the basic CLP instruction and register model. The commands of each coprocessor appear as new assembler mnemonics, and the registers of the coprocessor appear to the CLP progammer as new scalar and array registers. Some of the array registers are located in shared memory pool 4 (shown as 44 in FIG. 1). The coprocessor can execute asynchronously with the CLP. This allows the CLP to continue processing instructions while a coprocessor is executing a command. A wait instruction causes the CLP to wait until a coprocessor execution command is completed.

The Instruction Memory (56) typically consists of eight embedded RAMs. They are loaded during initialization and contain the program instructions for forwarding frames and managing the system. The instruction memory holds 16K instructions for data forwarding tasks, for guided traffic, and control tasks.

A Dispatcher Unit. This tracks thread usage, and fetches and dispatches new frames to idle threads. Data frames are dispatched to the next available PPU. This dequeues frame-addresses from the up and down dispatcher queues (up-GDQ, up-GCQ, dn-GRO/1, din-GBO/1 and dnGCQ). After dequeue, the dispatcher unit reads part of the frame-header from the up or down DataStore (DS) and stores this in the shared memory pool (44) As soon as a CLP becomes idle, the Dispatcher unit passes the appropriate control information like the Code Instruction Address (CIA) via bus (46) or (50), to the CLP. The dispatcher uses a separate bus (58) to deliver header information to the shared memory pool (44) The Dispatcher also handles timers and interrupts by dispatching the work for these functions to an available thread.

A Tree Search Memory (TSM) Arbiter (110). There are a number of shared internal and external memory locations available to each CLP. Since this memory is shared, an arbiter is used to control access to the memory. The TSM can be accessed directly by the code, and can for example be used to store routing tables in the TSM. Also, the TSM will be accessed by the TSE (12) during tree searches.

A Completion Unit (CU). The Completion Unit performs two functions. First, it interfaces the CLPs to the Up and Dn EDS (Enqueue, Dequeue and Schedule Island). The EDS performs the enqueue action whereby a frame address, together with appropriate parameters called the FCBPage, is queued in either a transmission queue, a discard queue, or a dispatcher queue. When the target is a transmission queue, the hardware-configured flow control mechanisms determine if the frame is to be placed into the transmission queue, or in a discard queue. Second, the Completion Unit guarantees frame sequence. Since it may happen that multiple threads are processing frames that belong to the same flow, precautions must be taken that these frames are enqueued in the up or dn transmission queues in the right order.

The Completion Unit uses a label that is generated by a Hardware Classifier (54) upon frame dispatch.

Hardware Classifier. This is placed in the data path between the Dispatch Unit and the PPUs. It performs classification and provides information to the destination thread. For up-frames, the Hardware Classifier Assist provides a classification for well known cases of frame formats. Classification results are passed to the CLP, during frame dispatch, in terms of the CIA (code instruction address) and contents of four GPRs (general purpose registers). For dn-frames, the Hardware Classifier Assist determines the CIA, depending on the frame header. For both up and dn frame dispatches, the Hardware Classifier Assist generates a label that is used by the Completion Unit to maintain frame sequence.

Up and dn Data Store Interface and Arbiter. Each thread has access to the up and dn DataStore via the data store coprocessor (26): Read access is provided when reading "more Data" and write access is provided when writing back the contents of the DataPool to the DataStore. Since there are multiple threads and only one of them at a time can access the up DataStore and one at a time can access the dn DataStore, one arbiter for each DataStore is required.

Control Access Bus (CAB) Arbiter and WEBWatch interface. The CABArbiter arbitrates among the threads for access to the CAB. All threads have access to the CAB via the CAB coprocessor (28). This allows access to all memory and registers functions in the processor unit. This allows any thread to modify or read all configuration areas. The CAB can be thought of as the memory map for the processor unit.

The CABWatch interface provides access to the entire CAB from outside the chip ads using 3 chip I/Os.

Debug, Interrupts and Single Step Control. The CAB allows the GCH thread or CABWatch to control each thread. For example, the CAB can be used by the GFH thread or CABWatch to run a selected thread in single-step execution mode.

Core Language Processor (CLP):

The network server utilizes several types of CLPs in its architecture. Each type is programmed to handle a particular function.

The GDH is a General Data Handler and serves mainly for forwarding frames. Each GDH typically has a dedicated control processor. Each control processor employs multiple coprocessors in accordance with the present invention. The number of CLPs that are required by the system is generally determined by performance evaluation. The architecture and structure are completely scaleable, limited only by the amount of silicon area, which should include a larger arbiter and instruction memory as the number of CLPs increases.

The GCH Guided Cell Handler has the same hardware as the GDH. However, a guided frame can only be processed by the GCH. It is programmable on the Web (CIP-Ena register if the GCH is enabled to also process data frames (in which case it takes the role of a GDH) The GCH has additional hardware compared to the GDH hardware assist to perform tree inserts and deletes. The GCH is used to execute guided-cell related code, perform chip and tree management related code like aging and to exchange control information with the CP and/or another GCH. When there is no such task to perform, the GCH will execute frame forwarding-related code and in this case, behaves exactly like a GDH.

GPH (General Processor Handler) This processor has access to the hardware mailbox that connects to the Power PC. Since RIT1/2 does not contain a Power PC, the GPH will behave exactly the same as a GDH.

The GTH (General Tree Handler) has additional hardware compared to the GDH and GCH hardware assist to perform tree inserts, tree deletes and rope management. The GTH will process data frames when there are no frames containing tree management commands in the GPQ.

Referring to FIG. 2, CLP #1 (34) comprises an instruction fetch, decode, and execute unit (88), general purpose registers (80) and special purpose registers (82) comprising scalar registers (84) and array registers (86). In like manner, the CLP #2 (36) contains similar components.

With the exception of two instructions the CLP (34) completely executes the instruction within its execution unit (102). The two exceptions are the direct and indirect Coprocessor Execute instructions (417) of FIG. 4. These two instructions initiate command processing on one of the attached coprocessors. The coprocessors can execute commands concurrently with each other and concurrently with instruction processing within the CLP. Whenever a CLP instruction involves a coprocessor it specifies a 4-bit number called a coprocessor identifier in the range 0 to 15 indicating which coprocessor is to be selected for the operation.

Shared Memory Pool

The 4 K byte shared memory pool (44) holds the array registers for at least some of the coprocessors. It is used by all threads running in the PPU. 1 K byte is used by each thread and is subdivided into the following areas: FCBpage (which could be considered an array register for the enqueue coprocessor); Data Fetch; Scratch Memory Area (which could be considered an array register for the CLP), and System area. The pool can be viewed as being divided into equal segments according to the number of threads. Within each segment, the address space is subdivided into array registers for the CLP and for the various coprocessors that need the array registers. Two of the address lines in the pool are driven according to which CLP and which thread are active.

PPU Coprocessors

Each coprocessor is a specialized hardware assist engine that performs functions that would have required a large amount of serialized code if embedded in the core. The coprocessors run in parallel with the CLP and provide functions used for data movement, including IP header modification, maintaining information about flows for use in flow control algorithms, accessing internal registers via the CAB, maintaining counts for flow control as well as Management Information Blocks (MIB), both standard andproprietary, and enqueueing frames to be forwarded. Each coprocessor, unless noted otherwise, maintains a set of scalar registers and arrays for each thread in the PPU.

Referring again to FIG. 2, the PPU (10) comprises two Core Language Processors (34, 36) and several attached coprocessors (12, 20, 22, 24, 26, 28, 30 and 32). These coprocessors provide hardware acceleration for specific network processing tasks such as high speed pattern search, data manipulation, internal chip management functions, frame parsing, and data fetching.

The various coprocessors and their functions are described as follows:

Tree Search Coprocessor

A tree search engine (TSE) coprocessor (12) is assigned coprocessor identifier 2. The TSE has commands for tree management and direct access to a tree search memory via arbiter (110). It has search algorithms for performing searches for LPM (longest prefix match patterns requiring variable length matches), FM (fixed size patterns having a precise match) and SMT (software managed trees involving patterns defining either a range or a bit mask set) to obtain frame forwarding and alteration information. A data store coprocessor (26), assigned coprocessor identifier 1, for collecting, altering or introducing frame data into the network processor's frame data memory (112). Details of a tree search architecture and operation useful in the present invention can be found in the following United States patent applications, identified by Ser. Nos. 09/543,531, 09/544,992 and 09/545,100.

Checksum Coprocessor

A conventional checksum coprocessor (20) calculates and validates checksums using an appropriate algorithm provided to it for computing the Internet Checksum. As such, it performs its checksum operation on half word data with a half word checksum result. The following commands are available:

Generate Checksum; and

Verify Checksum

Results of the commands are found in an Accumulation Scalar register and a Stake Scalar register. The Accumulation Scalar register contains the result of the checksum calculation, while the Stake scalar register contains the byte location following the last half word included in the checksum. Data for the Checksum coprocessor is found in the shared memory pool.

The commands to the coprocessor include the following options:

1) IP Header:

When an IP Header is indicated, the starting location (i.e. stake) for the layer 3 header is passed. The hardware determines the length of the IP header from the header length field and loads this value into a length scalar register. When generating the checksum, a value of zero is substituted for the half word that contains the current checksum.

2) Data Block:

The data found in the Shared Memory pool is treated as a block of data and a checksum may be generated or the checksum may be verified. The starting location in the Shared Memory pool, and the length is passed. When verifying a block of data, the checksum is placed into the Accumulation Scalar Register. When checking a block of data, the checksum is found in the Accumulation register.

Engueue Coprocessor

The enqueue processor (24) provides two functions:

1. It allows the code to create a FCB (frame control block) Page, a 256 bit register called a Working FCBPage that is used to construct up and down FCB pages. The register contains all of the parameters that are required to enqueue frame on EDS (Enqueue, Dequeue/Scheduling) up or EDS down. Examples of the parameters contained in the register are FCB address for up, target part number, frame alteration information and next loop identification.

2. It provides an interface between a CLP and the Completion Unit (CU). The CU operates independently of the CLPs, but contains a register called a Ready FCBPage for each CLP processor. Upon enqueue, the register is copied to the CU after which the enqueue is taken over by the enqueue processor. At this point, the CLP is freed up to process the next frame. The EQ sets its ready bit (?) If, however, the Ready FCBPage in the CU is not empty, the EQ will block transfer from the CLP to the CU until the EQ register is empty and will then allow the transfer. The enqueue coprocessor manages the interface between a thread and the completion unit and the use of the FCBpage that is maintained in the Shared Memory Pool. Each thread has 3 FCBpage locations into which enqueue information about a frame may be maintained. Two of the pages are used to improve the performance to the Completion Unit interface by swapping between the two pages during consecutive enqueues. The assembly language code written for the thread does not differentiate between these two pages as this is managed by the hardware. The third page is used by the thread to allow for the creation of new frames by the code. An example of this is the creation of guided traffic for learning that is re-enqueued to be executed by a GTH thread.

When a CLP thread issues an enqueue command, the FCBpage is marked as in use. If the other location is available for use, a new frame can then be dispatched to the thread without waiting for a response from the Enqueue coprocessor. The Completion Unit fetches the FCBpage from the Shared Memory pool through the Enqueue Coprocessor, and it provides this to the EDS (either ingress or egress as indicated by the enqueue command). Once this has occurred the FCBpage is marked as free. If both FCBpages are marked in use, a third frame is not allowed to start.

The following commands are supported by the Enqueue Coprocessor:

Enqueue Ingress (ENQUP) enqueues to the ingress flow control and scheduler via the completion unit Enqueue Egress (ENQDN) enqueues to the egress flow control and scheduler via the completion unit Enqueue Clear (ENQCLR) clears (set all fields to zero) the current FCBPage The Data Store Coprocessor This coprocessor (26) performs the following functions:

1. It interfaces to the up datastore and down datastore;
2. It receives configuration information during the dispatch of a timer event or interrupt;
3. It calculates checksums on frames.

This coprocessor typically contains a 320 byte data buffer and a memory of 8 words of 128 bits each.

Frame data is accessed through the data store coprocessor to interface with the ingress data store, which contains frames that have been received from the media, and the egress data store, which contains reassembled frames received from a packet routing switch. It also receives configuration information during the dispatch of a timer event or interrupt.

The datastore coprocessor uses arrays that are defined in a shared memory pool. The arrays are the datapool, that can hold eight QuadWords, and two Scratch Arrays, one of which holds eight QuadWords and one of which holds four QuadWords. Additional scalar registers used for control to read and write the array contents from and to the Ingress or Egress Data Stores are maintained in the Datastore Coprocessor. There is one set of arrays and scalar registers defined for each thread supported by the Datastore Coprocessor.

These Shared Memory Pool arrays serve as a work areas for the Datastore Coprocessor: Instead of reading or writing directly to a Data Store, a larger amount of frame data is read from the Data Store into these Shared Memory Pool arrays or a larger amount of data is written from the these arrays into the Data Store. The unit of transfer is a QuadWord, which is defined as 16 bytes.

The following commands are available for the Datastore Coprocessor:

1. Write Egress Data Store (WRDNDS)

Allows the CLP to write to the Egress Data Store. Writes occur in multiples of QuadWord units only. The data is taken from one of the Datastore Coprocessor arrays (DataPool or Scratch Array).

2. Read Egress Data Store (RDDNDS)

Allows the CLP to read data from the Egress Data Store and place it into one of the Datastore Coprocessor arrays. Reads occur to the egress data store in multiples of Quad-Word units only.

3. Write Ingress Data Store (WRUPDS)

Allows the CLP to write data to the Ingress data store. Writes occur to the ingress data store in multiples of QuadWord units only.

4. Read ingress Data Store (RDUPDS)

Allows the CLP to read data from the Ingress Data Store (in multiples of QuadWord units only). Read More Frame Data from the Egress Data Store (RDMOREDN)

A hardware assisted read from the Egress Data Store. RDMOREDN continues reading the frame from where the last read left off and places the data into the DataPool. As data is moved into the DataPool, the hardware tracks the current location in the frame that is being read and captures the link pointer from the twin buffers in order to determine the location of the next twin buffer. This address is used by the hardware for subsequent RDMOREDN requests until the twin is exhausted and the next twin is read. Since the contents of the datapool is a map of a twin's content, there is a potential for the frame data to wrap within the DataPool; the code keeps track of the data's location within the DataPool.

Read More Frame Data from the Ingress Data Store (RDMOREUP)

A hardware assisted read from the Ingress Data Store. RDMOREUP continues reading the frame from where the last read left off and places the data into the DataPool. As data is moved into the DataPool, the hardware tracks the current location in the frame that is being read and captures the link maintained in the buffer control block area in order to determine the location of the frame's next data buffer. This address is used by the hardware for subsequent RDMOREUP requests until the data buffer is exhausted and the next buffer is read. The code keeps track of the frame data's location within the DataPool.

Lease Twin Buffer (LEASETWIN) returns the address of a free twin buffer (used when creating new data in the Egress Data Store).

The Control Access Bus (CAB) Coprocessor

This coprocessor (28) allows the network processor to control selected registers throughout the network processor system. It can initialize certain registers for purposes including system initialization, and can read certain registers for system diagnostics and maintenance.

The coprocessor interfaces to the embedded processor complex (EPC) web arbiter. The arbiter arbitrates among the CLPs and the web watch. This allows all of the CLPs to read and write on the web.

The CAB coprocessor provides interfaces to the CAB arbiter and the Control Access Bus for a CLP thread. A thread must load the operands for a CAB access, such as CAB address and data. The protocol to access the CAB is then handled by the CAB interface coprocessor, which provides the following commands:

Arbitrate for CAB Access (WEBARB)

Used by a thread to gain access to the CAB. Once access is granted, that thread maintains control of the CAB until it releases the CAB.

Read/Write CAB (WEBACCESS)

Moves data onto or from the CAB and the attached CAB accessible registers.

The source and destination within the PPU are General Purpose Registers (GPRs).

Preempt CAB (WEBPREEMPT)

Used only by the GFH thread, it allows the GFH to gain control of the CAB for a single read/write access, even if the CAB has already been granted to another thread.

Additional details relating to the architecture and operation of the Checksum, Datastore, Enqueue and CAB coprocessors are shown in U.S. patent application, Ser. No. 09/384,691 String Copy (StrCopy) Coprocessor.

The String Copy coprocessor (22) extends the CLPs capabilities to move blocks of data. The data is moved within the shared memory pool only. The following command is available:

String Copy (Strcopy):

This command is used to move multiple bytes of data between arrays. The command passes the starting byte locations of the source data block, the sink data block, and the number of bytes to move.

Counter Coprocessor

The Counter Coprocessor (30) provides access along bus (72) to a counter manager (not shown) that may be shared between all of the PPUs. The coprocessor interfaces with all of the counter programs and performs the updates of the counters. It is implemented with a FIFO buffer (76) between its scalar register and the coprocessor execution interface (16). A second FIFO buffer (78) is located between its array registers and the coprocessor data interface (14). Each thread functions as if it has its own Counter Coprocessor. An external (to the PPU) address and data bus are used for this coprocessor. In this manner, the system can be implemented to allow more than one PPUs to arbitrate for the use of the Counter Coprocessor through the external bus.

A thread can request a counter update through the Counter Coprocessor and continue processing without waiting for the Counter Manager to complete the operation. The Counter Coprocessor signals the request to the Counter Manager and passes the operands of the Counter Access command to the Counter Manager for processing. The Counter Coprocessor has an eight-deep queue for holding Counter Access commands issued by the four threads running in the PPU. The Counter Coprocessor provides the following command: Counter Access (CtrAccess) increments or adds a value to a counter. The command operands are a counter identifier (in the form of Counter memory), index and offset, an increment or add command, and a value field; read a count or write a count; or read and clear a count value. A thread does not wait for command execution unless the Counter coprocessor queue is full.

More details of the counter coprocessor and its operation can be found in U.S. patent application Ser. No. 09/656,556 entitled "Coprocessor for Managing Large Counter Arrays".

Policy Coprocessor

The Policy Coprocessor (32) provides an interface (74) to the Policy Manager (not shown) for a thread. It is implemented with a FIFO buffer (76) between its scalar register and the coprocessor execution interface (16). A second FIFO buffer (78) is located between its array registers and the coprocessor data interface (14). A thread requests an update to the "color" of a frame through this interface. The color of a frame is used as part of the network processor's configurable flow control mechanism which determines what actions may be taken on the frame. A thread must wait until the Policy Manager, via the Policy Coprocessor, returns a result. The Policy Manager accesses the policy control block for the flow that this frame is a member of. Operands include the policy control block address, the length of the packet and the color currently assigned to the frame. The result returned is a new color for the frame.

Each CLP (34, 36) is connected to the coprocessors (12, 20, 22, 24, 26, 28, 30 and 32) via two interfaces: the Coprocessor Execution Interface (16) and the Coprocessor Data Interface (14). The functions of these interfaces are described in more detail in FIG. 4.

A 4-bit coprocessor identifier uniquely identifies each coprocessor within the PPU. Each coprocessor can support up to 256 special purpose registers. An eight bit register number in the range 0 to 255 uniquely identifies a special purpose register within PL a coprocessor. The combination of coprocessor number and register number uniquely identifies the register within the PPU. There are two types of special purpose registers: scalar registers and array registers.

Register numbers 0 through 239 are reserved for scalar registers. A scalar register has a minimum length of 1 bit and a maximum length of 32 bits. Scalar register bits are numbered 0 through 31 starting with 0 at the rightmost or least significant bit and ending with 31 or the leftmost or most significant bit. Scalar registers of length less than 32 bits are right aligned and the remaining bits are considered unimplemented. When the CLP reads scalar registers of lengthless than 32 bits, the value of unimplemented bits is hardware dependent. Writing to unimplemented bits has no effect.

Register numbers 240 through 255 are reserved for array registers. An array register has a minimum length of 2 bytes and a maximum length of 256 bytes. The CLP reads or writes an array register, partitions within the shared memory pool (44), 2 bytes at a time (halfword), 4 bytes at a time (word) or 16 bytes at a time (quadword).

The use of general-purpose registers is well-known in the art, and accordingly will be discussed in a general fashion. The general-purpose registers may be viewed by a programmer in two ways. A programmer may see a general purpose register as a thirty two bit register, as is indicated by the thirty-two-bit labels which are represented with a 4 bit number from the set 0, 2, 4, . . . 14. In this sense the programmer sees eight 32-bit general purpose registers. A programmer may also manipulate a general-purpose register as a sixteen-bit register, according to the sixteen-bit labels which are represented as a 4 bit number from the set 0, 1, 2, . . . 15. In this sense the programmer sees sixteen 16-bit registers.

Each coprocessor includes a status register which stores information from the busy signal field. This register indicates to a programmer whether a given coprocessor is available, or if it is busy. A coprocessor completion code register stores information from the OK/K.O. field (415) of FIG. 4. Therefore, if a programmer needs to know whether a given coprocessor is busy or is available, the programmer can get this information from a coprocessor status register. Similarly, a coprocessor completion code register provides information to a programmer as to the completion of the coprocessor tasks.

Each CLP includes the following sixteen-bit program registers: a program counter register, a program status register, a link register, and a key length register. Two 32-bit registers are also provided: the time stamp register, and the random number generator register. A scalar register number is also provided for each of the aforementioned registers.

The general-purpose registers may be viewed by a programmer in two ways. A programmer may see a general purpose register as a thirty-two bit register. A programmer may also manipulate a general-purpose register as a sixteen-bit register.

The array registers are revealed to a programmer through the array register numbers.

Figure 4:
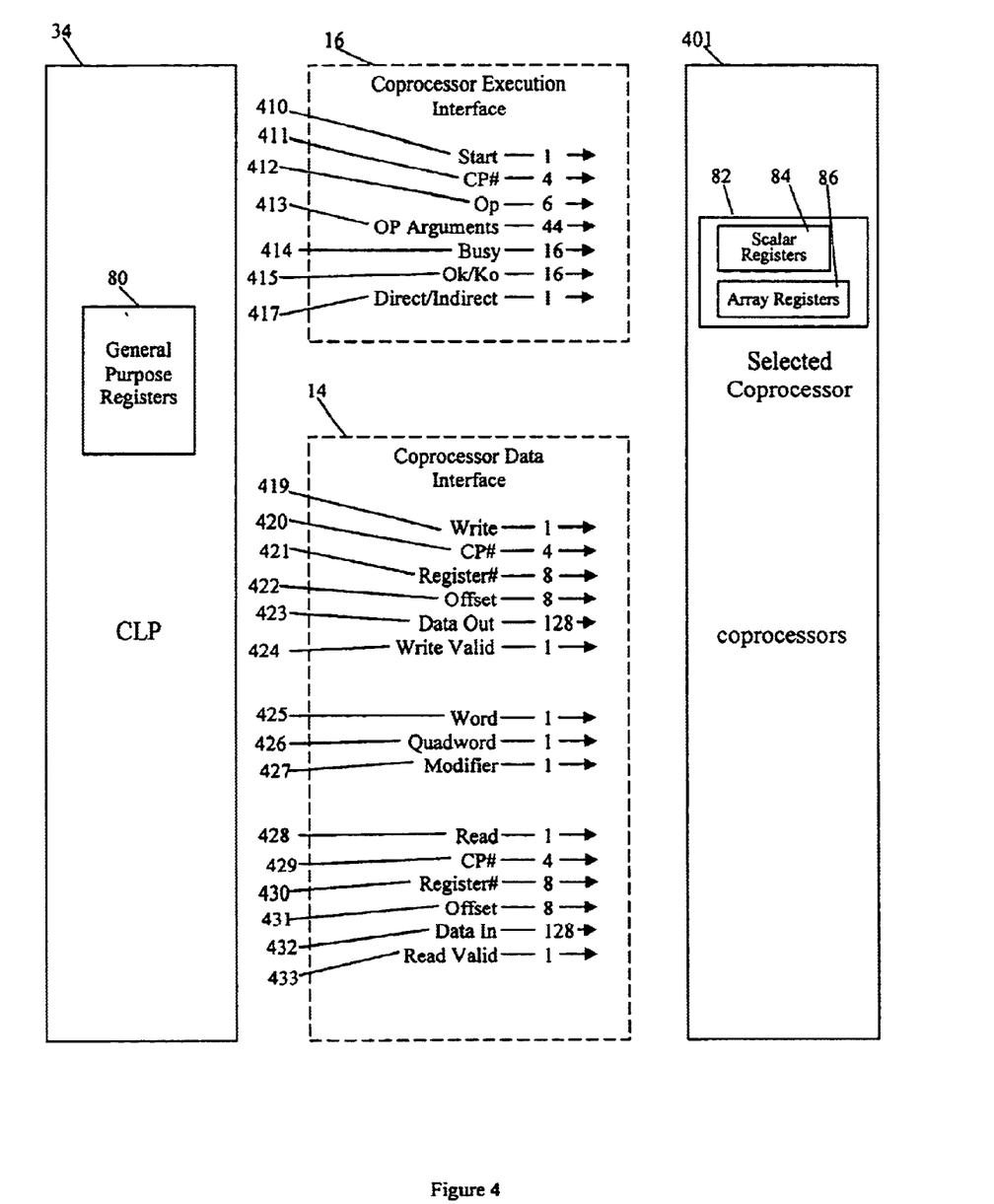
FIG. 4 describes a coprocessor execution interface and a coprocessor data interface which connects a core language processor to multiple coprocessors.

FIG. 4 depicts interface signals which connect the CLP (34) to its coprocessors (401) through Coprocessor Execution Interface (16) and the Coprocessor Data Interface (14). The number of individual wire connections is indicated by the numbering label appearing next to the arrow in each of the individual assignments. For the purposes of this discussion the selected coprocessor (20, 22, . . . ) represents the coprocessor whose coprocessor identifier matches the coprocessor identifier appearing on either (411), (420), or (429) depending on the operation as described subsequently.

The execution interface (16) enables the CLP (34) to initiate command execution on any of the coprocessors (20, 22 . . . ). The coprocessor number (411) selects one of 16 coprocessors as the target for the command. When the CLP activates the start field (410) to logical 1, the selected coproessor 411 as indicated by coprocessor number (411) begins executing the commend specified by the 6-bit Op field (412). The op arguments (413) are 44 bits of data that are passed along with the command for the coprocessor 411 to process The busy signal (414) is a sixteen-bit field, one bit for each coprocessor (401), and indicates whether a coprocessor is busy executing a command (bit=1) or whether that coprocessor is not executing a command (bit=0). These 16 bits are stored in the scalar register where bit 0 of the register corresponds to coprocessor 0, bit 1 to coprocessor 1, etc. The OK/K.O. field (415) is a sixteen-bit field, one bit for each coprocessor (401). It is a one-bit return value code which is command specific. For example, it may be used to indicate to the CLP (34) whether a command given to a coprocessor (401) ended with a failure, or whether a command was successful. This information is stored within the CLP scalar register where bit 0 of the register corresponds to coprocessor 0, bit 1 to coprocessor 1, etc. The direct/indirect field (417) indicates to the selected coprocessor 411 which formal of the Coprocessor Execute instruction is executing. If direct/indirect=0, then direct format is executing, else if direct/indirect=1 then the indirect format is executing.

The Coprocessor Data Interface (14) comprises 3 groups of signals. The write interface (419, 420, 421, 422, 423, 424) is involved in writing data to a scalar or array register within a coprocessor. The read interface (427, 428, 429, 430, 431, 432, 433) is involved in reading data from a special purpose register (80) either a scalar register (84) or an array register (86) within a coprocessor. The third group (425, 426, 427) is used during both reading and writing of a scalar register or array register. Duplicate functions on both read interface and write interface serve to support simultaneous read and write to move data from one register to another.

The write interface uses the write field (419) to select a coprocessor 411 indicated by the coprocessor number (420). The write field (419) is forced to one whenever the CLP (34) wants to write data to the selected coprocessor. The coprocessor register identifier (421) indicate the register tit the CLP (34) will write to within the selected coprocessor 411. The coprocessor register identifier (421) is an eight-bit field and accordingly (256) registers arm supported. A coprocessor register identifier the range 0 to 239 indicates a write to a scalar register. A coprocessor register identifier in the range 240 to 255 indicates a write to an array register. In the case of an array register write, the offset field (422) indicates the starting point for the data write operation in the any register. This field is eight-bits in size and therefore will support 256 addresses within an array. The data out field (423) Yes the data that will be written to the coprocessor 411. It is 128 bits in size, and therefore up to 128 bits of information may be written in one time. The write valid field (424) indicates to the CLP (34) when the coprocessor 411 is finished receiving the date. This allows the CLP (34) to pause and hold the dam valid while the coprocessor (450) takes the dam The read interface (14) is similar in structure to the write interface (16) except that data is read from the coprocessor. The read field (428) corresponds to the write field (419), and is used by the CLP (34) to indicate when a read operation is to be performed on the selected coprocessor 411. The coprocessor number identifier field (429) determines which coprocessor 411 is selected. The register number field (430), offset field (431), and read valid field (433) correspond to (421) (422), and (424) in the write interface. The data-in field (432) carries the data from the coprocessor 411 to the CLP (34).

Read or write operations can have one of three lengths: halfword which indicates that 16 bits are to be transferred, word which indicates that 32 bits are to be transferred, and quadword which indicates that 128 bits are to be transferred. The read data (432) and the write data (423) are 128 bits in width. Data transfers of less than 128 bits are right aligned. Signals (425) and (426) indicate the data transfer size. 16 bit transfers are indicated by (425) and (426) both 0, 32 bits transfers are indicated by (425) and (426) being 1 and 0 respectively, and 128 bit transfers are indicated by (425) and (426) being 0 and 1, respectively.

The modifier field (427) is used during either a data read or data write operation. Each coprocessor interprets its meaning in its own fashion as defined by the coprocessor's hardware designer. It provides a way for the programmer to specify an additional bit of information to the hardware during either a read or write operation. The datestore coprocessor can skip the link field in the packet buffer in a linked list of packet buffers.

After initiating a task in a coprocessor, the CLP may either continue execution of instructions or it may stall the execution until the completion of the task in the coprocessor. In the case where the CLP continues execution of instructions concurrent with task execution within the coprocessors, at some subsequent point in time, the execution of a WAIT instruction by the main processor unit will cause it to stall the execution of further instructions until the completion of task execution on one or more coprocessors. In one form, the WAIT instruction stalls execution on the CLP until task completion within one or more coprocessors at which time the CLP resumes instruction execution at the instruction following the WAIT instruction. In another form, the WAIT instruction stalls execution of the CLP until task completion within a specific coprocessor. When that task completes, the CLP examines a one bit return code from the coprocessor along with one bit from within the WAIT instruction to determine whether to resume instruction execution at the instruction following the WAIT instruction or branch execution to some other instruction specified by the programmer.

Coprocessor execute instructions imitate command processing on a coprocessor by setting the 'start' signal in the coprocessor execution interface (16) of FIG. 1 to 1. Referring to FIG. 5, the coprocessor identifier (520) is obtained from instruction field (500) and indicates a selected coprocessor via the start signal. The 6 bit coprocessor command is obtained from the instruction field (501) and indicates by a signal to the selected coprocessor which command to begin executing. Upon activation of the start signal to a 1, the selected coprocessor activates to 1 its busy signal and keeps it at 1 until it completes execution of the command at which time it deactivates this signal to 0. The CLP continuously reads the 16 bits of signal and places them into its scalar register. Upon completion of the command, the selected coprocessor places this status in the scalar register.

Referring once again to FIG. 5, if the asynchronous execution field (502) of the instruction is 0 then the CLP indicates command completion by deactivating its busy signal. When this occurs, the CLP resumes fetching and execution of instructions. If the asynchronous execution field (502) of the instruction is 1 then the CLP continues fetching and execution of instructions regardless of the state of the busy signal.

Upon initiation of command processing in the selected coprocessor, the CLP supplies 44 bits of additional command specific information by a signal to the coprocessor. This information is derived in one of four ways depending on the instruction format as depicted in FIGS. 5a through 5d.

Figure 5A:
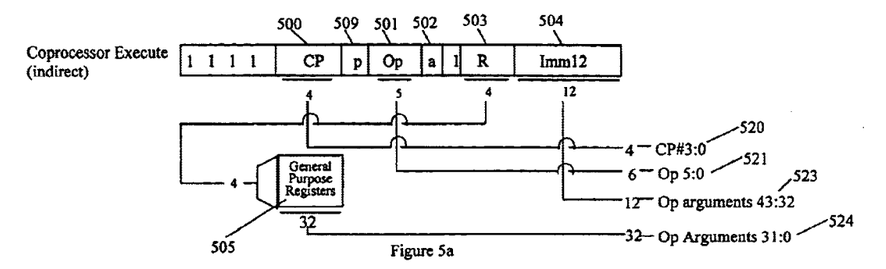
FIGS. 5a, 5b, 5c and 5d illustrate coprocessor execute instruction formats.

The Coprocessor Execute indirect format of FIG. 5a obtains the high order 12 bits (523) of command information from instruction field (504). The low order 32 bits of command information (524) are obtained from the 32-bit general purpose register (505). The selected register is determined by the 4-bit instruction field (503) which is restricted to the values {0, 2, 4, . . . 14}. In this way, a 32-bit register is chosen from the register. The CLP sets the signal to 1 indicating to the selected coprocessor that this is the indirect form of the instruction.

Figure 5B:
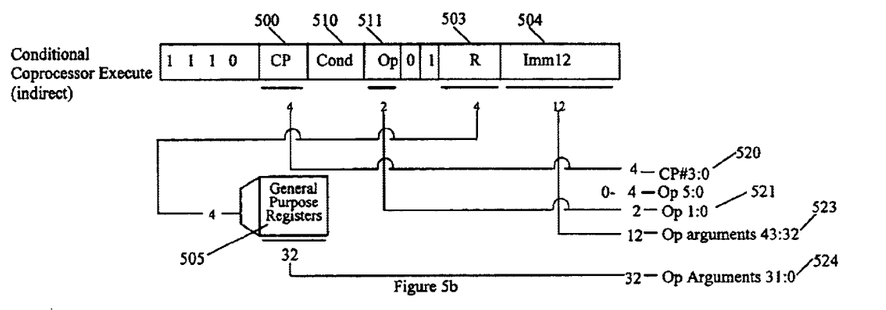

The conditional Coprocessor Execute indirect format for execution instructions is shown in FIG. 5b. Here, instructions are executed in the same manner as in FIG. 5a based on certain conditions being met. If they are not met, then the instructions are not executed. The instructions are executed based on the ALU codes in the CLP. The conditional execute utilizes 4 bits which results in the op field being shortened to 2 bits. Thus, the system allows for conditional execution on 4 of the 64 possible commands. The other commands are assumed to be zero. Thus, conditional execution based on long and short latency can be thereby achieved. The conditional execution of coprocessor instructions is especially useful in connection with the operation of the counter coprocessor.

Figure 5C:
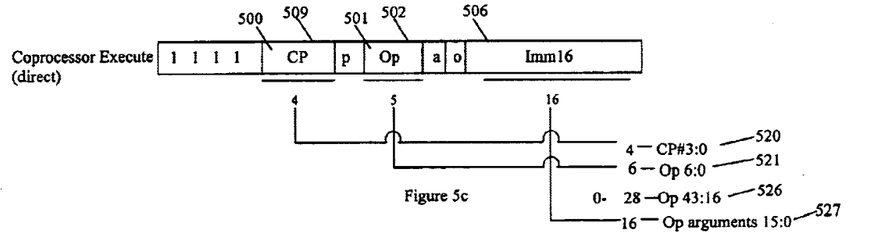

The Coprocessor Execute direct format of FIG. 5c obtains the low order 16 bits (527) of the command information from instruction field (506). The high order 28 bits (526) of the command information are set to 0. The CLP sets the signal to 0 indicating to the selected coprocessor that this is the direct form of the instruction.

Figure 5D:
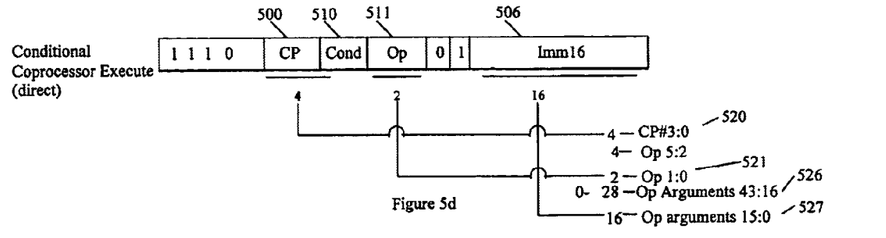

The conditional Coprocessor Execute direct format is shown in FIG. 5d as is configured to execute in the same manner as in FIG. 5c, based on certain conditions being met. As with FIG. 5b, the conditional execute utilizes 4 bits which results in the op field being shortened to 2 bits. Thus, the system allows for conditional execution on 4 of the 64 possible commands.

Figure 6A:
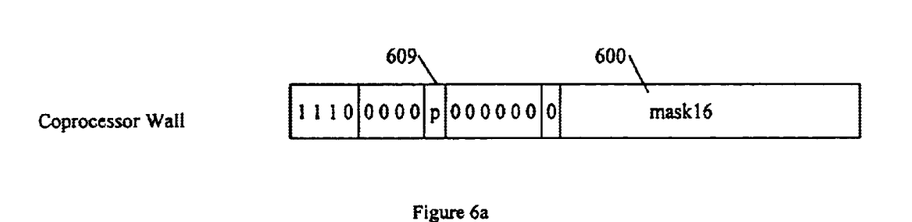
FIGS. 6a and 6b illustrate coprocessor wait instruction formats.

FIG. 6a depicts the instruction format for the Coprocessor Wait instruction. The CLP performs the bit wise AND operation of the 16-bit mask obtained from instruction field (600) with the Coprocessor Status Register. If the result is not zero indicating that one or more coprocessors are still currently executing commands, the CLP stalls fetching and execution of instructions. However it continues to perform the above AND operation until such time as the result is zero.

Figure 6B:
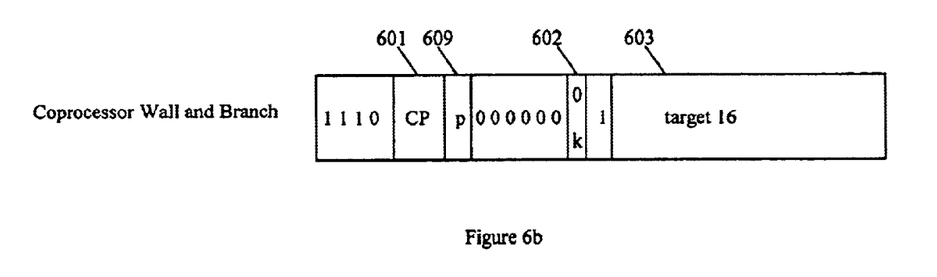

FIG. 6b depicts the Coprocessor Wait and Branch format. The coprocessor identifier field (601) indicates which specific bit in the Coprocessor Status is to be tested. For example if field (601) contains 1 then bit 1 of the coprocessor status register is tested. If the identified field (601) contains 15, then bit 15 of coprocessor status is tested. If the value of the tested bit is 1 indicating that the corresponding coprocessor has not yet completed the command execution, then the CLP stalls the fetching and execution of instructions. However it continues to perform the above operation until the value of the tested bit is 0 indicating that the corresponding coprocessor has completed command execution. At this time one of the two actions occur depending on the value of the ok field (602) of the instruction and the value of the bit in the Coprocessor Completion Code in the scalar register as selected by the coprocessor identifier (601). The CLP either resumes fetching and execution at the next sequential instruction or it branches and resumes fetching and execution of instruction at the instruction address indicated by instruction filed (603) according to the following table:

| Value of 602 | Value of Selected Coprocessor Completion Code Bit = 0 | Value of Selected Coprocessor Completion Code Bit = 1 |
|---|---|---|
| 0 | branch | next instruction |
| 1 | next instruction | branch |

The execution of instructions upon initiating a task in a coprocessing unit are described in greater detail in copending U.S. patent application Ser. No. 09/548,109 entitled 'Coprocessor Structure and Method for a Communications System Network Processor'.

The invention furthermore relates to independent processes in each of the multiple instruction execution threads (each of which relates to a different packet being processed) in each CLP and the procedure for dealing with latency in accessing data. Each of the execution threads is an independent process executing a sequence of instructions as the threads are allowed to gain access to the coprocessor hardware. The tree search coprocessor is pipelined to enable multiple execution threads to each have access simultaneously but at different phases (overlapping) in the tree search pipeline. Preferably, the invention employs multiple instruction execution threads with zero overhead to switch execution from one thread to the next. The threads are queued to provide rapid distribution of access to shared memory. Queueing of the threads serves to get the thread of highest priority to its long latency event as quickly as possible.

As previously noted, each PPU contains multiple instruction prefetch buffers, one for each execution thread. These prefetch buffers enable prefetch of instructions for idle execution threads during intervals where instruction bandwidth is not being fully utilized by active execution threads. This helps to insure that when control is switched to a new execution thread, the instruction prefetch buffer for that thread will be full, thus avoiding the possibility of the new thread stalling immediately due to lack of available instructions to execute. Accordingly, access priority to instruction memory is controlled so that the currently executing thread receives top priority, while the execution thread positioned to take control if the current thread stalls is given second priority. Likewise, the execution thread at the bottom of the execution queue is given last priority in instruction fetch access.

Full control is granted to the next thread when execution of an active thread stalls due to a long latency event (i.e. tree search), or temporary control is granted to the next thread when execution stalls due to a short latency event (i.e. coprocessor action in local data storage, or instruction fetch latency). If temporary control is granted to an alternate thread, then control is returned to the original thread as soon as it is unblocked. In contrast, if full control is granted to an alternate thread, that alternate thread will remain in control until it becomes blocked. This avoids wasting cycles for short latency events, but also allows the primary execution thread to reach the long latency event sooner. Otherwise, multiple execution threads might reach a long latency event at about the same time which would reduce the benefit of overlapping one thread's PPU execution with an alternate thread's tree search. Details relating to the allocation of control based on latency are given in pending U.S. patent application Ser. No. 09/542,189, entitled 'Network Processor with Multiple Instruction Threads'. The details of this allocation and thread execution control are described as follows.

When the computer is first powered up, each CLP thread is in the initialize state. When a packet is dispatched to a processor, the corresponding thread is moved to the ready state at which time it starts requesting cycles for execution.

An arbiter grants the execution cycle to the thread following a Boolean equation based on the logical function of the arbiter. If the cycle is granted, then the thread moves from the ready state to the execute state. In the execute state, the thread continues to make requests until execution stalls due to a latency event or the packet being processed is enqueued, thereby implying that the code work on that packet is done. If cycles are no longer granted, this implies that another thread is in control. That is the only reason that the arbiter would not grant a cycle. But in either of these two states (ready or execute), the thread will continuously request new execution cycles pausing for latency events, until the end of the packet processing is reached and the next packet is queued to be dispatched. The system then goes back to the initialize state and waits for the next packet The wait stage deals with either a long or a short latency event. Regardless of which event occurs, the processor stalls and the active thread defaults to the wait stage. The thread then quits requesting execution cycles until the latency event is completed.

The same dispatch action that moves a thread from the initialize stage to the ready state enters the thread number into a FIFO buffer so that the thread to which the first packet is dispatched will become the highest priority thread. Subsequent dispatch actions supply additional thread numbers into the FIFO. The thread number in the highest priority position of the FIFO will stay in that position until it encounters a long latency event whereupon the thread is rotated back to the beginning of the FIFO and goes from the highest priority to the lowest priority thread. A short latency event will not cause the thread to lose its priority in the FIFO buffer.

If the thread is done with the processing of the packet, the packet is enqueued for transmission to an output port and the thread number is removed from the FIFO buffer.

New packets are dispatched from a high-level controller (not shown). This controller chooses a thread and a processor to handle each packet. That decision provides an input command to the FIFO buffer. It also provides an input to the state machine instructing the machine to move from the initialize state to the ready state. Along with that command from the external controller, the thread number to which the packet is to be dispatched must also be delivered from the controller to the FIFO.

There are basically two types of events which might cause execution to stall, those which cause a short interruption and those which cause an extended interruption of the current program flow. A short interruption may be caused by a branch instruction which requires the instruction prefetch queue to be refilled because of a change in the program flow. Alternately, the program may stall while waiting for a coprocessor to perform a task relating to data in the processor's local memory. An example of this would be for a checksum coprocessor to calculate a new checksum on a modified header field. An event is considered a short interruption if the latency is less than 25 processor cycles. Long latency events typically introduce a latency more than 25 and typically in excess of 50 to 100 processor cycles. These have a much more significant impact on overall performance.

There are numerous alternative means for determining a long or a short latency event. The length of latency can be under the control of the programmer whereupon the hardware or its configuration is not a factor in the determination. On the other hand, a threshold register could be set with a 25 cycle threshold, and the hardware would determine how many cycles an operation was going to require and make an automatic decision based on that determination.

A coprocessor instruction is one type of instruction that the processor executes. Some of the bits in the field identify which coprocessor is intended. One bit defines the particular instruction as a long or a short latency event. Thus, it is possible that a programmer can define two identical accesses to control memory, one defined as a long latency event and the other as a short latency event. The thread execution control function is designed to minimize the impact of these long latency events. Accordingly, a long latency event will cause full control to switch to an alternate execution thread, while a short latency event will cause only a temporary switch to an alternate thread.

The basic details of the protocol processor units PPUs and the core language processors are known to persons of ordinary skill in the art and do not comprise a part of the present invention except to the extent that they have been modified or implemented to become part of the overall architecture of the network processor system and that they interengage with the specific function coprocessors and other components of the system. The specific details including the architecture and the programming of the individual coprocessors useful in the present invention are not deemed to comprise a part of the present invention.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. In the operation of an embedded processor complex for controlling the progammability of a network processor, the processor complex including a plurality of protocol processor units (PPUs), each PPU containing multiple core language processors (CLPs), each CLP having at least two code threads, each PPU utilizing a plurality of coprocessors useful for executing specific tasks for the PPU, multiple logical coprocessor interfaces to provide access between each CLP and the coprocessors, and two arbiters between the CLPs and the coprocessors, wherein the coprocessors are selected from the group including a tree search coprocessor, a checksum coprocessor, a stringcopy coprocessor, an enqueue coprocessor, a datastore coprocessor, a CAB coprocessor, a counter coprocessor and a policy coprocessor, and wherein one of the arbiters is a coprocessor execution interface arbiter to determine the priority between multiple code threads.

2. In the operation according to claim 1, wherein the coprocessors include dedicated coprocessors that support multiple code threads of each CLP.

3. In the operation according to claim 1 further including a FIFO buffer between each CLP and at least one coprocessor.

4. In the operation according to claim 3, wherein the FIFO buffer is between each CLP and the counter coprocessor.

5. In the operation according to clam 3, wherein the FIFO buffer is between each CLP and the policy coprocessor.

6. A network processing system including an embedded processor complex for controlling the programmability of a network processor, said embedded processor complex including a plurality of protocol processor units (PPUs), each PPU containing:
   a) at least two core language processors (CLPs), each CLP having at least two code threads;
   b) a plurality of coprocessors for executing specific tasks for the network processing system,
   c) multiple coprocessor interfaces to access and share the resources of the coprocessors with each CLP, and
   d) two arbiters between the CPLs and the coprocessors, wherein the network processing system including specific operating instructions executed by the threads of the CLPs which result in commands to control coprocessor operation, which commands flow through the interface between the CLPs and the coprocessors, and wherein the instructions serve to enable conditional execution of specific coprocessor operations.

7. The network processing system of claim 6 wherein the coprocessors are dedicated to supporting the code threads of each CLP.

8. The network processing system of claim 7 wherein the coprocessors are selected from the group including a tree search coprocessor, checksum coprocessor, stringcopy coprocessor, enqueue coprocessor, datastore coprocessor, CAB coprocessor, counter coprocessor and policy coprocessor.

9. The network processing system of claim 7 further including a FIFO buffer between each CLP and at least one of the coprocessors.

10. The network processing system of claim 9 wherein the FIFO buffer is between each CLP and the counter coprocessor.

11. The network processing system according to claim 9 wherein the FIFO buffer is between each CLP and the policy coprocessor.

12. The networking processing system according to claim 6 wherein each of said core language processors contains an arithmetic logic unit.

13. The network processing system according to claim 6 wherein each coprocessor contains special purpose registers and each of the core language processors contains copies of the special purpose registers contained in each coprocessor.

14. A method of controlling the execution of instructions within an embedded processor complex which contains a plurality of protocol processor units (PPUs), each protocol processor unit containing at least two core language processors (CLPs), each CLP having at least two code threads, wherein the threads are used by each of said PPUs for executing specific tasks for the PPUs, and used by multiple logical coprocessor interfaces coupled to said plurality of coprocessors to provide access between the coprocessors and cach CLP, and two arbiters between the CLPs and the coprocssors, and including the use of dedicated coprocessors that support the multiple code threads of the PPU, and wherein one or more of the coprocessors are selected from the group including a tree search coprocessor, checksum coprocessor, stringcopy coprocessor, enqueue coprocessor, datastore coprocessor, CAB coprocessor, counter coprocessor and policy coprocessor, and wherein a coprocessor data interface arbiter serves to determine the priority between data threads.

15. The method according to claim 14 wherein a coprocessor execution interface arbiter serves to determine the priority been execution threads.

16. The method of claim 15 including the step of provding specific operating instructions executed by the CLPs which result in commands to control coprocessor operation, which commands flow through the interface between the CLPs and the coprocessors.

17. The method according to claim 16 wherein the operating instructions enable conditional execution of specific coprocessor operation.

18. The method according to claim 17 wherein the execution is either direct or indirect.

19. The method accordg to claim 14 further including providing a FIFO buffer between each CLP and at least one of the coprocessors.

20. The method according to claim 19 wherein the FIFO buffer is between each CLP and the counter coprocessor.

21. The method according to claim 19 wherein the FIFO buffer interface is between each CLP and the policy coprocessor.

22. In the operation of an embedded processor complex for controlling the programmability of a network processor, the processor complex including a plurality of protocol processor units (PPUs), each PPU containing multiple core language processors (CLPs), each CLP having at least two code threads, each PPU utilizing a plurality of coprocessors useful for executing specific tasks for the PPU, multiple logical coprocessor interfaces to provide access between each CLP and the coprocessors, and two arbiters between the CLPs and the coprocessors, wherein the coprocessors are selected from the group including a tree search coprocessor, a checksum coprocessor, a stringcopy coprocessor, an enqueue coprocessor, a datastore coprocessor, a CAB coprocessor, a counter coprocessor and a policy coprocessor, and wherein one of the arbiters is a coprocessor data interface arbiter that determines the priority between data threads.

23. In the operation according to claim 22 further including a FIFO buffer between each CLP and at least one coprocessor.

24. In the operation according to claim 23, wherein the FIFO buffer is between each CLP and the counter coprocessor.

25. In the operation according to claim 23, wherein the FIFO buffer is between each CLP and the policy coprocessor.

26. A network processing system including an embedded processor embedded processor complex for controlling the programmability of a network processor, said complex including a plurality of protocol processor units (PPUs), each of said PPUs containing:
  a) at least two core language processors (CLPs), each CLP having at least two code threads;
  b) a plurality of coprocessors for executing specific tasks for the network processing system,
  c) multiple coprocessor interfaces to access and share the resources of the coprocessors with each CLP, and
  d) two arbiters between the CPLs and the coprocessors, and wherein the network processing system including specific operating instructions executed by the threads of the CLPs which result in commands to control coprocessor operation, which commands flow through the interface between the CLPs and the coprocessors, and wherein the instructions enable the system to identify long latency events and short latency events according to the expected response time to access data in response to a particular coprocessor command, and to grant full control to another thread when execution of an active thread stalls due to a long latency event, or to grant temporary control to another thread when execution of an active thread stalls due to a short latency event.

27. A method of controlling the execution of instructions within an embedded processor complex which contains a plurality of protocol processor units (PPUs), each protocol processor unit containing at least two core language processors (CLPs), each CLP having at least two code threads, wherein the threads are used by each of said PPUs for executing specific tasks for the PPUs, and used by multiple logical coprocessor interfaces coupled to said plurality of coprocessors to provide access between the coprocessors and each CLP, and two arbiters between the CLPs and the coprocessors, and the step of providing instructions that enable the system to identify long latency events and short latency events according to the expected response time to a particular coprocessor command, and to grant full control to another thread when execution of an active thread stalls due to a long latency event, or to grant temporary control to another thread when execution of an active thread stalls due to a short latency event.

* * * * *